(12) United States Patent
Lauro

(10) Patent No.: US 7,487,717 B2
(45) Date of Patent: Feb. 10, 2009

(54) FLAMELESS BARBECUE GRILL

(75) Inventor: B. Reno Lauro, Garland, TX (US)

(73) Assignee: Renphil Concepts, Santa Clarita, CA (US)

( * ) Notice: Subject to any disclaimer, the term of this patent is extended or adjusted under 35 U.S.C. 154(b) by 412 days.

(21) Appl. No.: 11/223,076

(22) Filed: Sep. 9, 2005

(65) Prior Publication Data

US 2006/0054029 A1    Mar. 16, 2006

Related U.S. Application Data

(60) Provisional application No. 60/608,619, filed on Sep. 10, 2004.

(51) Int. Cl.
*A47J 37/07*    (2006.01)
*A47J 37/00*    (2006.01)

(52) U.S. Cl. .............................. 99/445; 99/450; 99/425; 99/396; 99/449; 126/25 R; 126/39 M; 126/41 R

(58) Field of Classification Search ............... 99/445–6, 99/450, 425, 396, 449; 126/25 R, 39 M, 126/41 R
See application file for complete search history.

(56) References Cited

U.S. PATENT DOCUMENTS

| | | | | |
|---|---|---|---|---|
| 5,437,221 A | * | 8/1995 | Schwod | .................. 99/449 |
| 6,305,368 B1 | | 10/2001 | Rimback | |
| 6,481,343 B1 | * | 11/2002 | Rigney et al. | .................. 99/396 |
| 6,499,479 B1 | | 12/2002 | McLamb | |
| 6,520,174 B1 | | 2/2003 | Scigliuolo | |
| 6,640,799 B2 | | 11/2003 | Kahler et al. | |

* cited by examiner

*Primary Examiner*—Shawntina Fuqua
(74) *Attorney, Agent, or Firm*—Philip H. Lee

(57) ABSTRACT

A grill for a barbecuing, the grill having an upper grate, wherein a grillable foodstuff may be placed thereon and a lower grate having channels which may catch juices that drips from the foodstuff. The upper grate and lower grate are positionable relative to each other, so as to vary in position between a maximally overlapped (open) grill position and a minimally overlapped (closed) grill position.

20 Claims, 5 Drawing Sheets

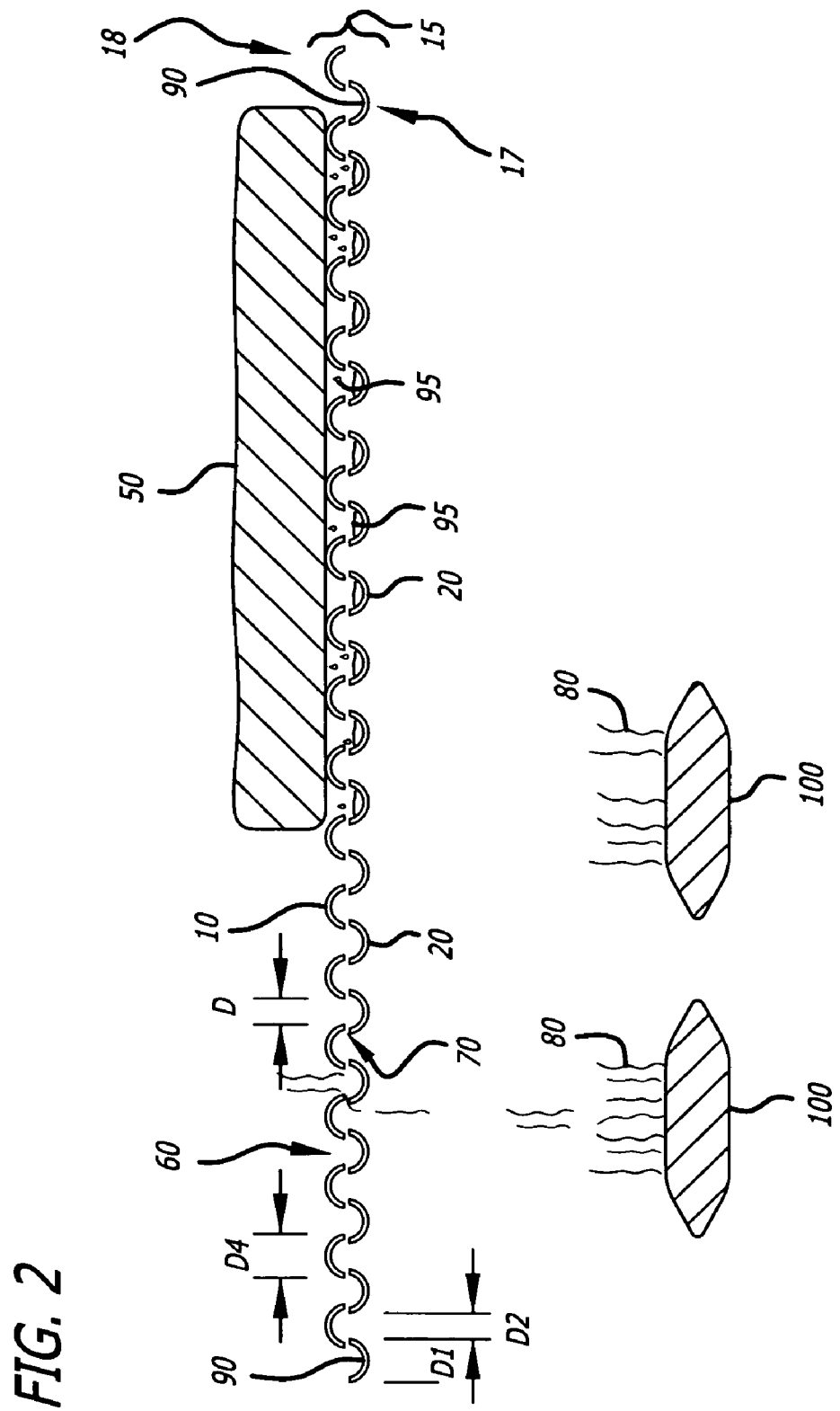

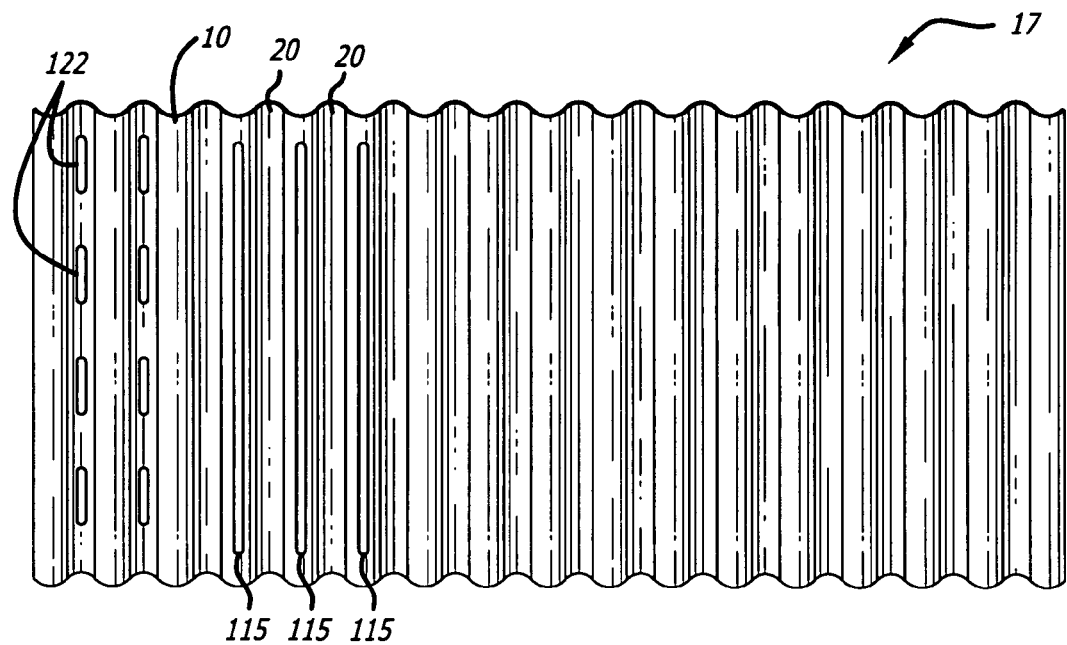
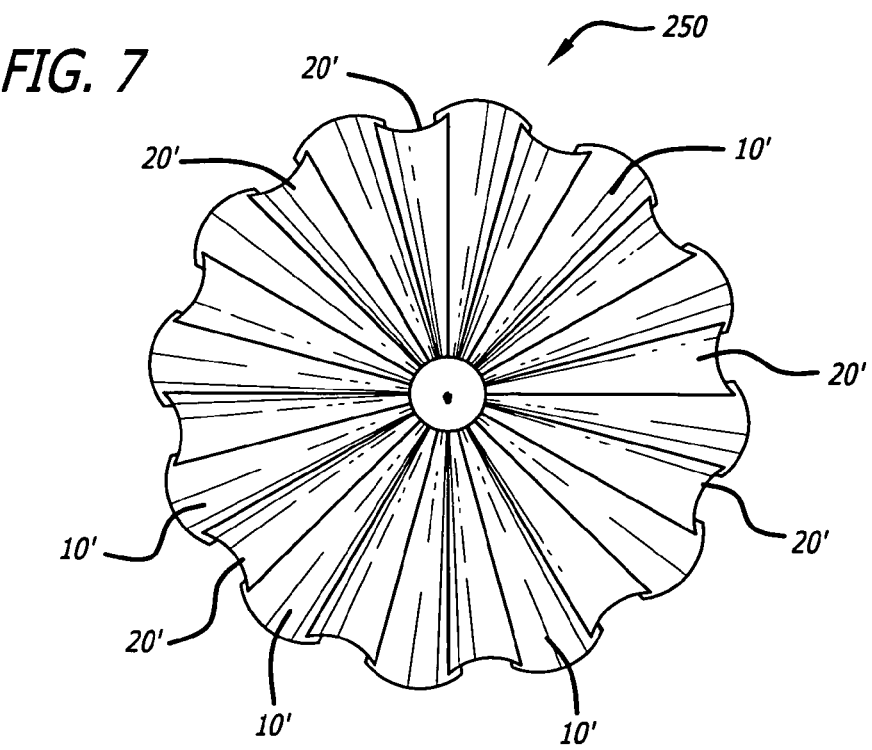

FLAMELESS BARBECUE GRILL

This application claims the benefit of U.S. Provisional Application 60/608,619 filed on 10 Sep. 2004, which provisional application is herein incorporated by reference.

BACKGROUND OF THE INVENTION

The present invention relates to barbecue grills and, more particularly, barbecue grills which reduce flare ups.

Cooking meats and other foods on an open grill suffers from a basic problem: greasy juices from meats and other grilled foods tend to drip down into the hot coals or heated lava rock located at the bottom of the barbecue grill causing flare ups.

Not only are flare ups a safety hazard because the flames are relatively uncontrolled, when flare ups occur, the cooking temperature may vary wildly and cause foodstuffs to cook unevenly or become burned. For example, meats that are being cooked may become charred in various places. Charring results in a carbon-like surface to the meat which can leave an undesirable, bitter taste to the finished, cooked meat.

Therefore, what is needed is a grill for barbecuing that can control the flow of juices from the grilled food onto the coals or lava rock.

SUMMARY OF THE INVENTION

In one embodiment, a grill design is provided that prevents juices from a grilled foodstuff from dripping onto cooking coals or lava rocks that are located at the bottom of the barbecue grill, while allowing heat to rise from the hot coals and lava rocks and thereby cook the grilled foodstuff placed on the top of the upper grate of the grill.

In another embodiment, the grill may comprise: an upper grate, where a grillable foodstuff may be placed onto, and a lower grate placed beneath the upper grate. The lower grate can have channels for collecting juices that drip from the grillable foodstuff. The upper grate and lower grate may be positionable relative to each other, so that the relative position may be varied between a maximally overlapped (open) grill position and a minimally overlapped (closed) grill position.

The upper grate may be formed from elongate sections, e.g., slats or bars, that are placed in parallel and held together by at least one connecting piece. This connecting piece may define a periphery to the upper grate and therefore connect to the end of each elongate section. The periphery of the upper grate may be substantially rectangular in shape. Or, the connecting piece may attach to a mid-portion of each elongate section, not the periphery of the upper grate.

Similarly, the lower grate may be formed of elongate sections, e.g., slats, that are preferably placed substantially in parallel. These parallel elongate sections may be connected together by one connecting piece or by several connecting pieces. The one connecting piece may define one side or part of the periphery of the lower grate and the periphery may be substantially rectangular in shape. Alternatively, the one connecting piece may connect each elongate section in some mid-location, so that the one connecting piece does not define any of the periphery of the lower grate.

In some embodiments, the upper grate and/or the lower grate may be stamped from one piece. In fact, in one embodiment, the grate may have an upper grate and lower grate that are identical.

In some embodiments, the periphery of the grill may define a circular or elliptical shape. For a circular-shaped grill, the upper grate may have elongate sections that radiate from a central axis, and is connected by at least one connecting piece. This connecting piece may also be circular and define the periphery of the upper grate. Similarly, the lower grate may have elongate sections that radiate from a central axis and have a connecting piece, e.g., a circular shaped piece that defines the periphery.

The grill, whether substantially rectangular, circular, or having some other peripheral shape, may further include a secondary collection channel or gutter for collecting juices gathered by the channels of the lower grate. The secondary collection channel may have a drain for directing the juices into a container.

The grill may have an upper grate and a lower grate which are positionable relative to each other.

The grill may have a "closed position", wherein the upper grate and lower grate are positioned so that any juices falling through the upper grate are captured by the channels in the lower grate and prevented from falling over the hot coals or lava rock at the bottom of the grill. Nevertheless, in this closed position, heat may rise from hot coals or lava rocks placed at the bottom of the barbecue grill and escape through gaps between the lower grate and upper grate and thereby allow heat to reach the foodstuff placed on the upper grate.

Thus, one embodiment of the grills may have an upper grate and lower grate that can be positionably adjusted to allow juices to fall through the pair of grates as with a conventional barbecue grill. The design of this particular embodiment of the grill thus can permit the juices to fall over the cooking coals to permit a controlled level of smoke to be created and thereby provide a level of smoky taste to the grilled meat or other foods. Additionally, however, the two grates of the grill may be positionably adjusted to stop such juices from falling over the hot coals or lava rock to thereby reduce or prevent uncontrolled flare ups.

BRIEF DESCRIPTION OF THE DRAWINGS

FIG. 2 shows, a side cross-sectional view of the upper grate and lower grate, while the two grates are positioned relative to each other in a "closed position" or a maximally closed position, so that juice from foodstuff is captured in the channels of the lower grate, although heat can still rise through a gap in the two grates to cook the foodstuff placed on the upper grate;

FIG. 6 shows, another embodiment of the holes that may be cut out of the precursor sheet of FIG. 4, to produce an upper or lower grate; and FIG. 7 shows, in accordance with the present invention, a grill having lower and upper grates, with elongate sections, e.g., slats placed axially from a central axis, wherein the width of each slat increases at the end nearer to the outer periphery, compared to the other end of the slat.

Corresponding reference characters indicate corresponding components throughout the several views of the drawings.

DESCRIPTION OF THE PRESENTLY PREFERRED EMBODIMENTS

Figure 1:
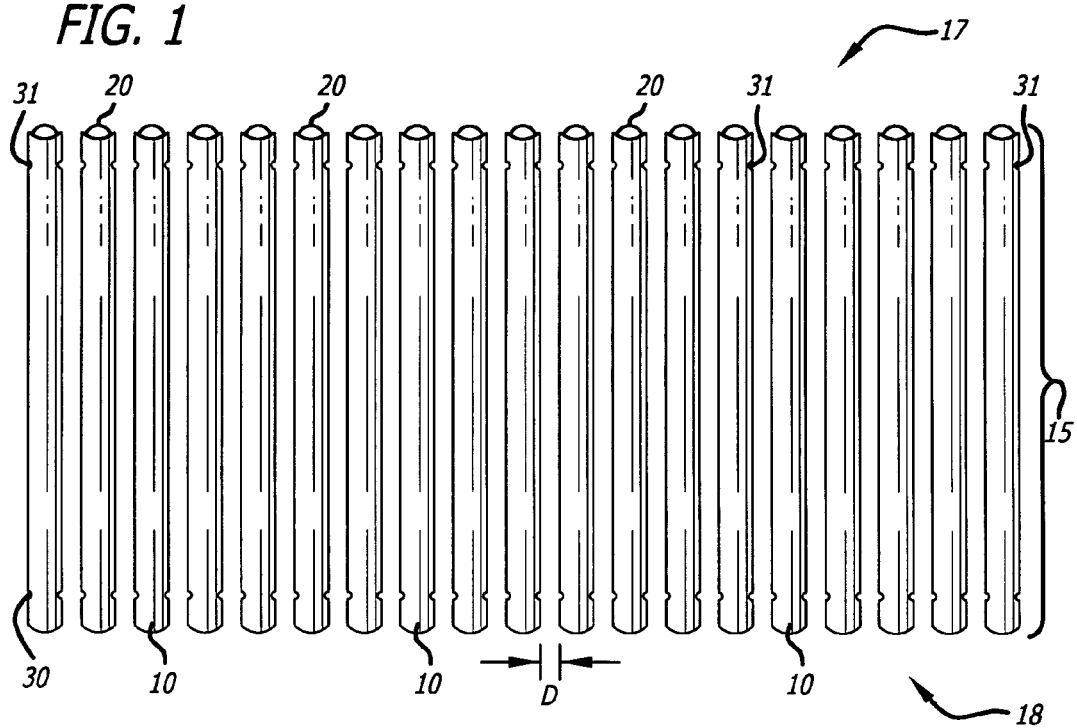
FIG. 1 shows a perspective view of a grill comprised of an upper grate and lower grate.

FIG. 1 shows a top view of the grill 15, in accordance with one embodiment of the present invention. The grill 15 can be comprised of at least two parts, an upper grate 18 and lower grate 17. Thus, as used herein a "grill" will refer to a two-layered device comprising an upper grate 18 and a lower grate 17, wherein "grate" will refer herein to a single layer of the grill. The upper grate 18 may include a plurality of elongate sections, e.g., upper bars or slats 10 and the lower grate 17 may include a plurality of elongate sections, e.g., lower bars or slats. 20. Each upper bar 10 of the upper grate 18 can be made with a curvature to present a convex face on the upper surface of the upper bar 10 where the grilled foodstuff can be set upon. Each of the lower bars 20 of the lower grate 17 may have a longitudinal juice collection channel along a part or substantially the entire length of each lower bar 20 such that the juice collection channel is facing upwards towards the grilled food. As shown in FIG. 1, the lower grate 17 and each lower bar 20 may be sized and dimensioned so that each lower bar 20 of the lower grate 17 may be immediately positionable underneath a corresponding upper bar 10 of the upper grate 18. In such relative position, the opening between adjacent upper bars and between adjacent lower bars coincide as to form parallel, longitudinal openings as shown in FIG. 1. In this maximally open grill position, it can been seen that there is a separation distance "D" between two adjacent upper bars 10. This opening between upper bars 10, allows the widest grill opening in order to permit the greatest exposure of the grilled foodstuff to the heat below the grill.

FIG. 2 provides a side view of the grill 15 of FIG. 1. As shown in FIG. 2, the upper grate 18 and lower grate 17 are shown. Each of the lower bars 20 can be formed with a channel having a shape 90 to catch greasy juices 95 that come from the foodstuff 50, such as a meat. The lower grate channel 90 may have a cross-sectional configuration such as a U or a V or any other form that can catch juices 95. The upper bars 10 of upper grate 18 may have a cross-sectional configuration which is an upside down U as shown in FIG. 2 or other forms such as an upside V, or forms such as a circle, ellipse, square, rectangle or another cross-sectional form that can support foodstuff 50 placed on top of the upper bar 10. Foodstuff 50 is shown on top of upper bars 18 of upper grate 18. The foodstuff 50 may be any known grillable foods, including without limitation, meats such as steak, poultry, fish or pork. The upper grate 18 with a plurality of upper bars 10 is shown positioned so that each opening 60 between adjacent upper bars 10 is entirely covered underneath by a lower bar 20 with respect to a downward line-of-sight. With the lower grate 17, positioned thusly, juices 95 such as grease from food stuff 50, can be caught in juice collection channel 90 of the each lower bar 20 of lower grate 17. The lower bars 20 may be inclined slightly to one end as to cause to juices 95 to flow to one end of the lower bars 20 at one end, where it can empty into another collection channel (not shown). The collection channel may be perpendicular and may be placed so as to catch juices from each of the lower bars 20. While FIG. 2 shows an embodiment of a grill, in accordance with invention, in a maximally covered position, importantly, there is still an opening or gap 70 between each the upper bars 10 and lower bars 20. This opening or gap is sufficient to allow heat 80 to rise from coals or lava rock 100 and to go escape through between upper grate 10 and lower grate 20, even though the lower grate 17 and upper grate 18 are in a maximally covered relative position. Thus, cooking of the foodstuff 50 can continue to occur even in this maximally covered grill position because gap 70 between the lower grate 17 and upper grate 18 permits heat 80 emanating from coals or lava rock 100 to thereby rise through the grill 15.

Figure 3B:
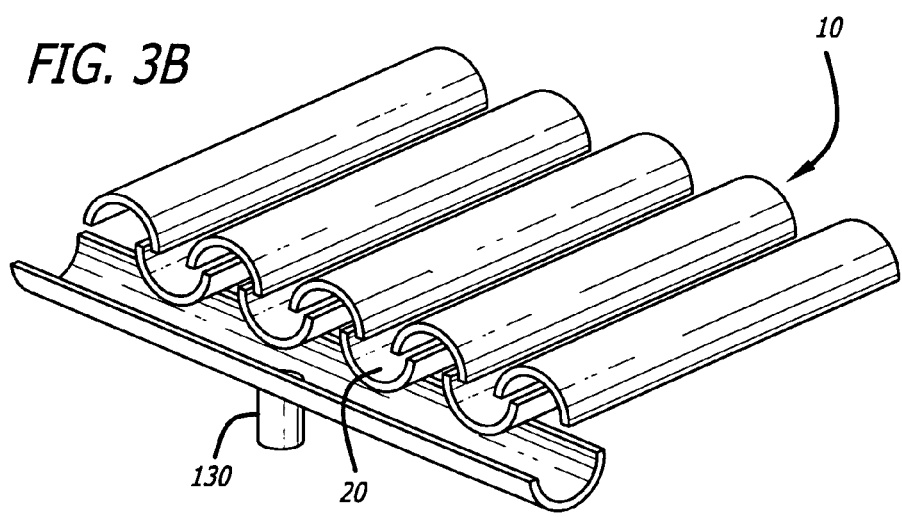
FIG. 3B shows a view of the upper grate, lower grate and a collection or secondary channel (or gutter) that may be placed at one end of each lower elongate section or slat to catch juices that the lower slats having channels has captured.
Figure 3A:
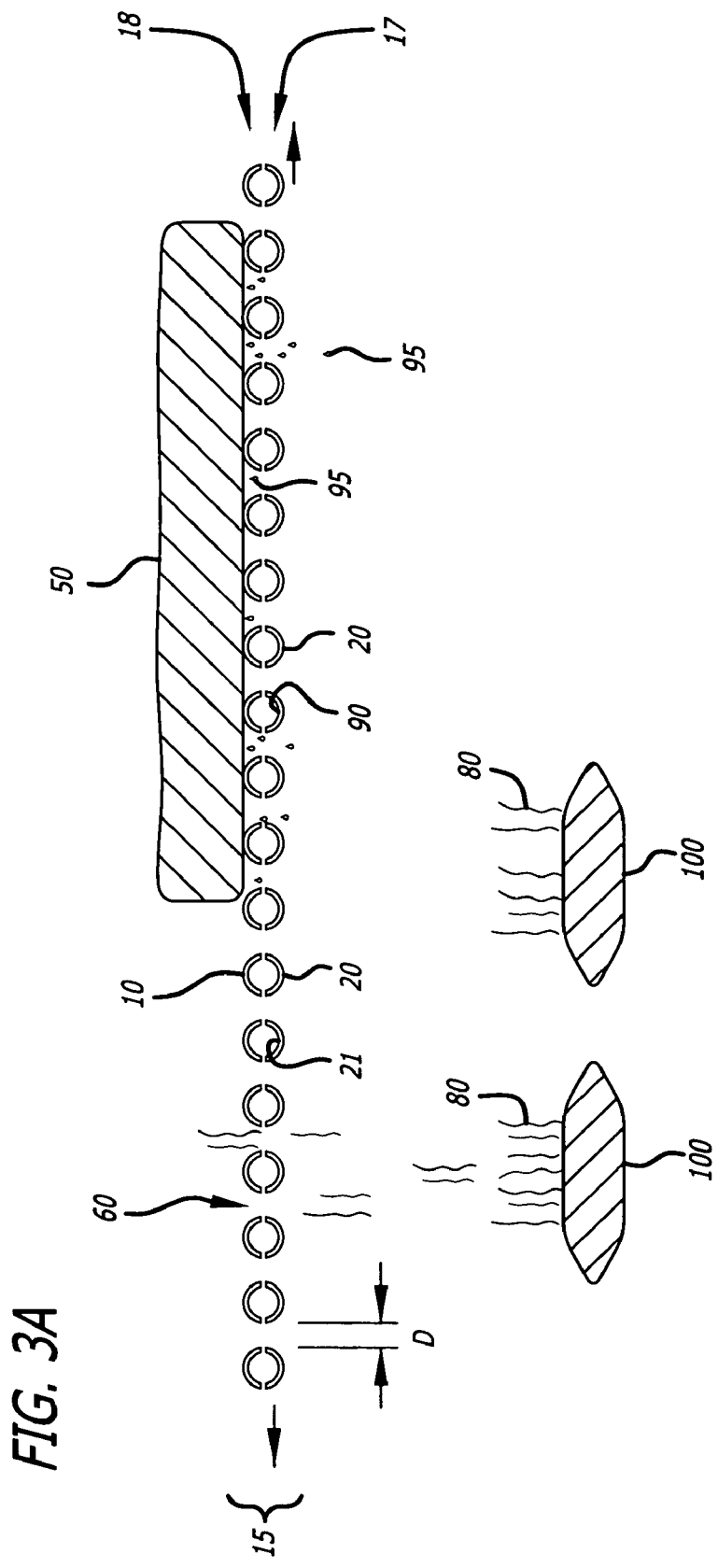
FIG. 3A shows a side, cross-sectional view of the same grate of FIG. 2, but with the two grates positioned relative to each other in the "open position" or maximally open position, wherein juices may fall from the foodstuff through the elongate slats, down over the hot coals or lava rock located at the bottom of the barbecue grill.

FIG. 3A, provides a side view of the grate shown in FIGS. 1 and 2, however, with the grill 15 in the minimally covered position. Here, the lower grate 17 can be horizontally displaced so that each lower bar 20 is placed directly underneath a corresponding upper bar 10 of upper grate 18. In this minimally covered grill position, the heat 80 emanating from hot coal or lava rock 100 can rise upwards directly through the opening 60 between two adjacent upper grates 10 and two adjacent lower grates 20 so that the rising heat 80 can cook foodstuff 50. In this minimally covered position, juices 95 from foodstuff 50 do not collect in the channels of the lower bars 20 but, instead, can fall freely down towards the bottom placed coals 100, so that the grill 15 functions similarly to a conventional grill.

FIGS. 1, 2 and 3A illustrate the features of an embodiment of the present invention. The grate, in accordance with one embodiment of the present invention comprises: (a) an upper grate 18 and (b) a lower grate 17. Preferably the separation distance between the upper grate 18 and lower grate 17 is less than about 1 inch and more preferably less than about 0.5 inches. The lower grate 17 has a juice collection channel that can effectively capture juices 95 when the lower grate 17 is positioned with respect to the upper grate 18 so that the grill 15 is in a maximally or partially closed position. The lower grate 17, relative to the upper grate 18, can be movable from between a maximal covered (relatively closed) position as shown in FIG. 2, wherein the juices 95 will be captured and a minimally covered (open) position. In addition, the upper grate 18 and lower grate 17 must be positionable relative to each other so that even in the so-called maximally covered position, there is a space 70 between the upper bars 10 and lower bars 20, which space 70 allows heat 80 to escape through the grill 15, so that cooking of foodstuff 50 can take place even in this maximally covered (closed) grill position. The upper bars 10 may be shaped in many different cross-sectional shapes, e.g., square rods or bars or round or elliptical shaped rods.

However, the relationship between the opening "D" that is made between adjacent upper bars 10 dictates to some extent the width D1, which is the width of the lower bars 20, and also D2, which is the separation width between two adjacent lower bars 20. It can be seen that D1+D2 cannot exceed D4+D, where D, D1, D2 and D4 are non-zero values. D1, however, must be greater than D. In a preferred embodiment of the present invention, D1 is slightly less than D4, thereby allowing at least some of the lower bars 20 of lower grate 17 to "hide" completely underneath the corresponding upper bars 10 in the maximally open grill position. In this maximally open grill position, the grill of the present invention largely mimics the operation of a conventional grill. Although it is preferred that D1 is slightly smaller than D4, it is, however, possible that D1 may also be larger than D4 and, nevertheless, provide a functional grill in accordance with the present invention.

FIG. 3B shows an embodiment that includes the grill design shown in FIGS. 1, 2 and 3A. A runoff gutter 140 may be included to the grill design 15. The runoff gutter (or secondary trough) 140 may be inclined to one end where a receptacle (not shown) may capture the excess run-off grease.

Alternatively, the runoff gutter may have a drain 130 at some point which can be used to collect the runoff grease. If the drain 130 is placed at some mid-point of the runoff gutter, both sides of the runoff gutter around the drain 130 must be slightly inclined as to gravitationally urge the grease to enter the drain 130. The runoff gutter may or may not be attached to the lower grate 20.

In operation, the grill 15 (Shown in FIGS. 1, 2 and 3) can be used in the following manner. The coals 100 may be heated. For instance, if the barbecue grill uses lava rocks 100, they may be heated by lighting the gas supplied. The lower grate 18 and upper grate 17 of grill 15 can be positioned for minimal grill covering (maximal flow of heat through the grill) as shown in FIG. 1 and FIG. 3A. Foodstuff, e.g., a steak 50, is placed on top of the upper grate 18. Over some time, grease 95 from steak 50 will begin to melt and fall through the opening 60 between upper grates 10 and lower grates 20. The flow of grease onto lava rock or coals 100 can cause small grease fires to flare up. When flare ups begin to occur, the lower grate 18 may be moved relative to the upper grate 17 to a maximally covered position, as shown in FIG. 2. This relative position change will have two immediate effects: (a) it will prevent additional juices 95 from dropping over the hot lava rock or coals 100 and thereby reduce the fuel for continuing flare-ups and (b) the present flare-up will be reduced in intensity since the grate opening 70 will be reduced from which the heat and flame can escape. As a result, food stuff 50 will not become undesirably charred, as the flame which reaches the foodstuff 50 will be immediately reduced in intensity. Moreover, the grill 15 can advantageously reduce the intensity of the heat escaping through the two layers of the grill 15 and prevent dangerous and undesirable flare-ups fueled by grease dripping onto hot lava rocks or coals 100.

Thus, the grill 15 offers increased safety to the user of the grill by controlling flare-ups. In addition, the grill can be used to control the heat applied to the foodstuff 50 by adjusting the opening 70 between upper grate 18 and lower grate 17, by moving either the upper bar 10 while the lower bar 20 remains stationary or, alternatively, moving the lower bar 20 relative to the upper bar 10.

In another example use of the present grill 15, if regular coals 100 are used, the goals can be ignited using lighting fluid. The grill can be maximally closed or open to control the initial flame over the coals lighted by lighting fluid. Once flames have died down and the coals are glowing, the grilled foodstuff 50 may be placed over the upper grate 18. Advantageously, the heat 80 that is applied through the grill 15 to the foodstuff 50 can be controlled by adjusting the opening 70 formed between upper bars 10 and lower bars 20, relative to each other.

Various embodiments of the grill are conceivable and come within the purview of the present invention. For example, the upper bars 10 may all be linked together by at least one connecting piece. Connecting pieces may be inserted into insertions 30 and 31 (FIG. 1). A first connecting piece can be attached at all insertions 31 and a second connecting piece can be attached at all insertions 30, thereby linking each longitudinal upper bar 10, into one unit upper grate 18. The connecting pieces may be spot welded together. A similar connecting piece or pieces may be used to form a unit lower grate 17 holding each lower bar 20 together.

Figure 4:
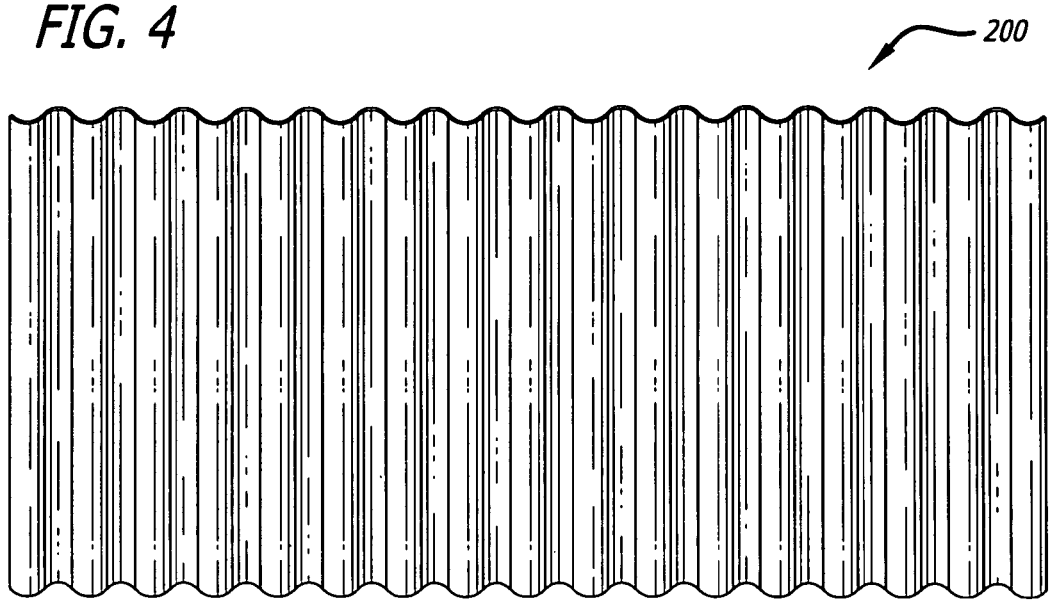
FIG. 4 shows a view of a one piece sheet that has been pressed to have peaks and valleys (channels) which may be a precursor for manufacturing a lower or upper grate.
Figure 5:
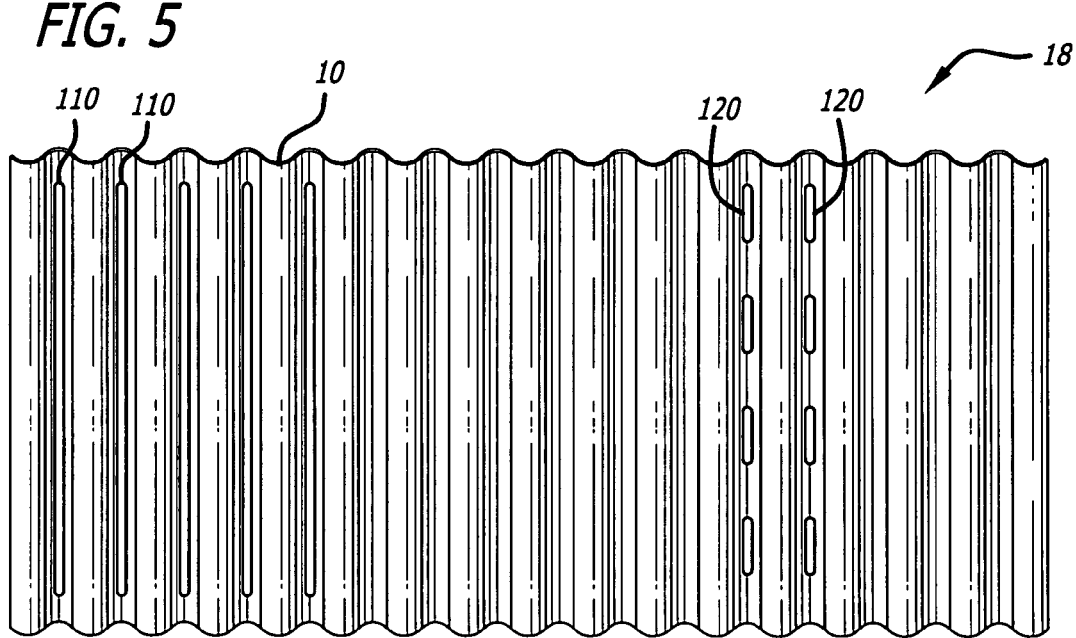
FIG. 5 shows, embodiments of holes that may be cut out of the precursor sheet of FIG. 4, to produce an upper or lower grate.

As shown in FIG. 4, the upper and lower grates may be initially formed from a one-piece, precursor metal piece 200 that is stamped to form undulations (peaks and troughs). Then, as shown in FIG. 5 and FIG. 6, various configurations of longitudinal openings may be machine stamped in one step to create the opening 110 or opening 120 that is necessary in both the upper grate 18 and lower grate 17. FIG. 5 shows the upper grate 18 with longitudinal holes 110 that may be stamped out one hole at a time or all at once for the entire upper grate 10. Alternatively, the upper grate 18 may have a plurality of smaller holes 120 along a longitudinal trough. The lower grate 20 may have corresponding holes and channels to permit a maximally open position and closed position.

FIG. 6 shows one embodiment of the lower grate 17 with several longitudinal holes 115 along one dimension of the lower grate 17. The lower grate 17 may optionally have smaller longitudinal holes 122 along one dimension of the grate 17. Lower grate 17 must have juice collection channels located between adjacent holes 115. Stamping the upper grate 18 and lower grate 17 can increase the speed at which the grill may be manufactured and reduce the overall cost.

As shown in FIG. 7, one embodiment of the present invention may be configured into a round grill 250. The same elements of the grill are present. That is the grill 250, although intended for a round grill, has an upper grate with upper elongate sections or slats 10' and lower grate with lower elongate sections or slats 20'. The upper grate and lower grate preferably has a separation distance that is less than about 1 inch and more preferably less than about 0.5 inches. The upper slats 10' and lower slats 20' are configured and sized to be positionable relative to each other and to provide a minimally overlapped (closed) positioned and a maximally overlapped position (opened) grill position. The upper grate and lower grate may have at least a connecting piece that holds each slat in proper spacing. The connecting piece may be attached anywhere along the length of the slats 10' and 20', joining all the lower slats to form the lower grate or joining all the upper slats to form the upper grate. Both the slats of the upper grate and lower grate may be shaped to be broader at the periphery and narrower towards the axis of the circular grates, e.g., as in a very narrow pie shape or a very narrow pizza cut. In the closed grill position, the grease is picked up by the channel or trough located in the slats of the lower grate. In the maximally overlapped, opened grill position, corresponding lower slats 20' "hide" directly underneath the corresponding upper slat 10'.

A runoff gutter may be placed around the outer periphery of the grill. The channeled, lower slats 20' of the lower grate may be inclined toward the periphery, where the runoff gutter may be placed around the outer periphery of the grill. The runoff gutter may have a drain which is placed slightly lower than the other portions of the runoff gutter to guide the grease down into the drain and into a collection container. Alternatively, a runoff drain may be placed centrally under the lower grill collecting grease from all of the slats of the lower grate and the grease may run into a collecting container.

To construct the circular grill, the lower grate may be first stamped from a one-piece metal piece to provide the appropriately spaced undulations (forming channels). The upper grate may be made from a single, flat sheet, or it may be may, like the lower grate, first stamped to have channels, and then stamped again to create narrow, pie-shaped holes, radiating axially outward from the center. Then, elongated holes may be stamped out in pie-shaped pieces, but with the peripheral (circumferential) outline intact. This simultaneously forms the necessary elongated holes and connection means to keep the channeled slats spaced appropriately apart.

It may be appreciated that there may be a wide variety of methods of linking, connecting and suspending the upper grate 18, 18' appropriately with the lower grate 17, 17'. The method of suspension will not be limited to the embodiments shown and it will be understood that any grill, having at least one positionable upper and/or lower grate, with respect to each other, defining a maximally overlapped (open) position and minimally overlapped (closed) position, is within the conceived boundaries of the present invention.

The invention has been described in terms of exemplary embodiments. The invention, however, is not limited to the embodiments depicted and described and it is contemplated that other embodiments, which may be readily devised by persons of ordinary skill in the art, as described by the claims below, are within the scope of the invention.

What is claimed is:

1. A grill for a barbecuing, comprising:
   an upper grate, wherein a grillable foodstuff may be placed onto; and
   a lower grate, placed beneath the upper grate, wherein the lower grate has channels for collecting juices from the grillable foodstuff,
   wherein the upper grate and lower grate are positionable relative to each other, such that the relative position may be varied between a maximally overlapped, open, grill position and a minimally overlapped, closed, grill position.

2. The grill of claim 1, wherein the upper grate is formed from elongate sections, and wherein adjacent elongate sections are connected by at least one connecting piece.

3. The grill of claim 2, wherein the at least one connecting piece is a piece that is not located at the periphery of the upper grate.

4. The grill of claim 2, wherein the at least one connecting piece is a piece that is placed around the periphery of the upper grate.

5. The grill of claim 2, wherein upper grate has a periphery that is substantially a rectangular shape.

6. The grill of claim 1, wherein the lower grate is formed from elongate sections, and wherein adjacent elongate sections are connected by at least one connecting piece.

7. The grill of claim 6, wherein the at least one connecting piece is a piece that is not located at the periphery of the lower grate.

8. The grill of claim 6, wherein the at least one connecting piece is a piece that is placed around the periphery of the lower grate.

9. The grill of claim 6, wherein lower grate has a periphery that is substantially a rectangular shape.

10. The grill of claim 1, wherein the upper grate is stamped from one piece.

11. The grill of claim 1, wherein the lower grate is stamped from one piece.

12. The grill of claim 1, wherein the lower grate has a periphery that is substantially a circular shape.

13. The grill of claim 1, wherein the lower grate has a periphery that is substantially an elliptical shape.

14. The grill of claim 1, further comprising:
    a secondary collection channel positioned and configured to permit flow of juices from the channels in the lower grate to the secondary collection channel.

15. The grill of claim 1, wherein the secondary channel has a drain, wherein juices captured by the collection channel flow into the drain.

16. A grill for barbecuing, comprising:
    an upper grate, wherein a grillable foodstuff may be placed onto; and
    a lower grate, wherein elements of the grate have channels for collecting juices,
    wherein the upper grate and lower grate are positionable relative to each other between a maximally overlapped, open, grill position and a minimally overlapped, closed, grill position,
    wherein the upper and lower grates are configured to fit inside the barbecue grill which is substantially circular.

17. The grill of claim 16, wherein the upper grate is formed from slat sections that radiate from a central axis, and is connected by at least one connecting piece.

18. The grill of claim 17, wherein the at least one connecting piece is a piece that is placed around the periphery of the upper grate.

19. The grill of claim 16, wherein the lower grate is stamped from one piece.

20. The grill of claim 16, further comprising:
    a secondary collection channel positioned and configured to permit flow of juices from the channels in the lower grate to the secondary collection channel.

* * * * *